United States Patent [19]

Büning et al.

[11] 4,155,954

[45] May 22, 1979

[54] METHOD OF GRAFTING VINYL CHLORIDE ONTO ETHYLENE-VINYL ACETATE AND ETHYLENE-ALKYL ACRYLATE COPOLYMERS

[75] Inventors: Robert Büning, Troisdorf Sieglar; Kurt Huhn; Rudolf Rasche, both of Troisdorf, all of Fed. Rep. of Germany

[73] Assignee: Dynamit Nobel Aktiengesellschaft, Troisdorf, Fed. Rep. of Germany

[21] Appl. No.: 799,401

[22] Filed: May 23, 1977

[30] Foreign Application Priority Data

May 26, 1976 [DE] Fed. Rep. of Germany ....... 2623503

[51] Int. Cl.² .................... C08F 263/04; C08F 265/04
[52] U.S. Cl. ............................ 260/878 R; 260/876 R
[58] Field of Search ........................ 260/878 R, 876 R

[56] References Cited

U.S. PATENT DOCUMENTS

| | | | |
|---|---|---|---|
| 3,789,083 | 1/1974 | Dumoulin et al. | 260/878 R |
| 4,006,201 | 2/1977 | Bauer et al. | 260/878 R |
| 4,007,235 | 2/1977 | Walker | 260/878 R |
| 4,012,460 | 3/1977 | Takahashi | 260/878 R |
| 4,028,329 | 6/1977 | Kahn et al. | 260/878 R |

*Primary Examiner*—Alan Holler
*Attorney, Agent, or Firm*—Sprung, Felfe, Horn, Lynch & Kramer

[57] ABSTRACT

An improved process for grafting vinyl chloride onto ethylene-vinyl acetate or ethylene-alkyl acrylate copolymers in the gel phase in the presence of radical formers soluble in the monomer wherein the ethylene-vinyl acetate or ethylene-alkyl acrylate copolymer is in powder form and a combination of at least two initiators having different decomposition temperatures are employed during the grafting, the resultant grafted copolymer and the use of the same as an impact strength improving component or polyvinyl chloride or vinyl chloride copolymers.

19 Claims, No Drawings

METHOD OF GRAFTING VINYL CHLORIDE ONTO ETHYLENE-VINYL ACETATE AND ETHYLENE-ALKYL ACRYLATE COPOLYMERS

BACKGROUND OF THE INVENTION

1. Field of the Invention

This invention relates to an improved process for grafting vinyl chloride onto ethylene-vinyl acetate or ethylene-alkyl acrylate copolymers performed in the gel phase in the presence of radical formers which are soluble in the monomer. More especially this invention relates to the preparation of graft copolymers wherein polyvinyl chloride is grafted onto powdered ethylene-vinyl acetate or ethylene-alkyl acrylate copolymers by a process wherein the basic copolymer is in the form of a powder and, a combination of different initiators are employed, which initiators have different decomposition temperatures from one another. This invention also relates to the resultant graft copolymer and its use as a impact improving agent for polyvinyl chloride homo-or copolymers.

2. Discussion of the Prior Art

It is known from German Offenlegungsschrift No. 2,421,900 to use as an impact strength improving component with PVC, graft polymer granules prepared by grafting vinyl chloride onto granulated ethylene vinyl acetate copolymers in the gel phase and having a high content of ethylene, e.g., between 85 to 97 weight-percent. Dilauroyl peroxide is used as the catalyst in Example A. The homogeneous incorporation of such granulated gel graft polymers into PVC, however, involves considerable difficulty, especially if the operation is to be conducted on a technical scale. For example, depending on the amount of graft copolymer used and on its chlorine content, quite specific process conditions must be maintained if reproducible and optimum results are to be achieved, especially with regard to the surface quality of the resulting products.

If it is desired to achieve products having smooth surfaces, it is necessary, when graft copolymer granules are used as components of the composition, to subject the PVC compositions to a granulating process and to make these as an impact strength improving component with PVC granules into the formed products.

In experiments it has been found that products of good surface quality can be arrived at by using powdered ethylene vinyl acetate or ethylene alkyl acrylate graft copolymers as compounding components for PVC or vinyl chloride copolymers. Nevertheless, powdered ethylene vinyl acetate and ethylene alkyl acrylate copolymers cannot be grafted with vinyl chloride in the same way as the granulated products.

If, for example, granules of ethylene-vinyl acetate copolymers are used as the basic polymer (e.g., granules of a length of about 3.8 to 4.2 mm and a diameter of about 2.8 to 2.9 mm) and lauroyl peroxide, for example, is used as the initiator, the transfer of the grafting operation from the laboratory scale using a one-liter autoclave, for example, to a layer scale, e.g., a 30-liter or 100-liter autoclave, involves no difficulties. By the continued injection of vinyl chloride, without the further addition of lauroyl peroxide, graft copolymers can be prepared on a semitechnical or technical scale having contents of up to 60 to 70% of vinyl chloride incorporated by polymerization.

If, however, ethylene-vinyl acetate copolymers are used in powder form, e.g., with grain sizes smaller than 300 microns, and the same enlargement of the scale is attempted, considerable difficulty is encountered. Although the production of graft polymers using powdered ethylene copolymers is successful in the one-liter autoclave, if the same process conditions (circulation temperature of, e.g., 68° C. and dilauroyl peroxide initiator) are applied to a larger batch, such as a 30-fold batch using a 30-liter autoclave, the polymerization will come to a stop in the 30-liter autoclave at a low degree of transformation. It is no longer possible to continue the grafting of vinyl chloride onto the powdered basic polymer without the addition of more initiator. If additional vinyl chloride containing the initiator in solution is pumped in, further polymerization will take place. Nevertheless, the fabricating qualities of the compositions prepared from these graft copolymers and PVC are not satisfactory in practice. As a result of the poor working qualities of the molding compositions, moldings are produced which contain numerous inhomogeneities.

If the same experiment is performed in an autoclave having a thirty-liter capacity, but using dicetyl percarbonate as initiator at a circulation temperature of 45° C., the transformations become higher, but again products are obtained whose working characteristics are not adequate for commercial purposes.

If this experiment is performed, not in a thirty-liter autoclave, but in a 100-liter autoclave with correspondingly larger amounts, the transformation becomes further reduced. If it is performed on a still larger scale, such as for example in a two cubic meter autoclave with a corresponding quantity, the above-described difficulties become considerably greater.

It is an object of this invention, therefore, to provide a commercially suitable process for the preparation of graft copolymers. It is a further object of this invention to provide a commercially suitable process which can be carried out in large vessels to prepare valuable polyvinyl chloride graft polymers of basic polymers which are in powder form.

It is a further object of this invention to provide improved polyvinyl chloride graft polymers which, when combined with polyvinyl chloride homo-or copolymers, provide improved impact strength, U-notch test values and rigidity.

These and other objects of this invention will become apparent from the following description and claims.

SUMMARY OF THE INVENTION

Broadly this invention contemplates an improvement in a method of grafting vinyl chloride onto ethylene-vinyl acetate or ethylene-alkyl acrylate copolymers in the gel phase in the presence of a radical former soluble in the monomer, which improvement comprises employing ethylene-vinyl acetate or ethylene-alkyl acrylate copolymer in powdered form and carrying out the gel phase polymerization employing at least two initiators having different decomposition temperatures.

Preferred basic polymers are those containing 0.5 to under 15 wt.-%, preferably 3.5 to 13 wt.-%, of vinyl acetate, or alkylacylal and 99.5 to 85 wt.-%, preferably 96.5 to 87 wt.-%, of ethylene incorporated by polymerization.

The process can be performed in vessels having a capacity of at least 100 liters. Preferably, it is carried out in a vessel having a capacity of at least 1,000 liters and generally between 1,000 and 50,000 liters.

The reaction is performed at pressures below the saturation pressure of vinyl chloride, so that a two-phase system is present during the polymerization, that is, a gas phase and a solid phase. The vinyl chloride is employed in amounts such that the polymer units corresponding thereto account for between 20 and 20 wt.-%, preferably between 30 and 55 wt.-% of the resultant graft polymer.

The method of the invention is practiced preferably without the addition of other adjuvants such as water, emulsifiers and suspension stabilizers, for example. Small amounts of organic solvents, regulators and the like, can be present. The use of adjuvants, however, is not to be excluded.

In a preferred embodiment of the process of the invention, first the basic polymer is intimately mixed with the initiator combination below the polymerization temperature, preferably with constant stirring, and then vinyl chloride is diffused into the mixture in the autoclave until the liquid phase disappears, such an amount being injected that the weight ratio of the basic polymer to the vinyl chloride amounts to from 10:0.1 to 10:5, and then the grafting is initiated by heating, additional vinyl chloride being injected without initiator as required in the course of the polymerization.

It is desirable to keep the contents of the reactor in constant motion even during the polymerization, by the use, for example, of suitable stirring mechanisms such as band stirrers or shearing or wall-running stirrers and the like.

The gel graft polymerization is performed in the absence of air (oxygen). It is desirable for the autoclave to be purged with nitrogen and/or freed of air by a vacuum and purged with vinyl chloride, prior to the introduction of the vinyl chloride.

In another advantageous embodiment of the method of the invention, the initiator combination is dissolved in the vinyl chloride monomer below the polymerization temperature before it is injected, and this solution is diffused into the basic polymer in the autoclave at a temperature below the polymerization temperature, until the liquid phase has disappeared. After the mixture of VC and initiator has been diffused into the basic polymer, the reaction mixture is heated to the polymerization temperature, and the heat of reaction that forms is removed by appropriate cooling. The ratio of the basic polymmer to the vinyl chloride at the beginning of the polymerization is between 10:0.1 and 10:5. For the preparation of graft copolymers with a higher PVC content, additional vinyl chloride can be injected without initiator.

The present invention is to include, as monomers to be incorporated by grafting, not only pure vinyl chloride, but also mixtures of vinyl chloride and other monomers which can be copolymerized therewith, such as vinyl acetate, ethylene, propylene, acrylonitrile, etc. these additional monomers being contained in the mixture in minor amounts, say, between 5 and 20 wt.-%. The additional vinyl chloride can be fed in continuously or from time to time in the course of the process, or it can be delivered in a single, rapid injection.

Suitable radical formers in accordance with the invention are combinations of such initiators as are known to be used as individual components in the polymerization of vinyl chloride, provided that the initiator combination is soluble in vinyl chloride. It is desirable to use initiator combinations in which the decomposition temperatures of the individual components are at last 10° C. apart, preferably about 15° to 30° C. apart.

Suitable initiator combinations are, for example, those in which the one initiator component has a decomposition temperature in the range from 0° C. to 45° C., and the other initiator component has a decomposition temperature in the range from above 0° to above 45° C. The term *decomposition temperature,* as used herein, is to be understood to mean the temperature range at which an amount of radicals sufficient for polymerization purposes is constantly yielded.

Suitable radical formers to be used in combination are, for example, peroxydicarbonates and peroxides of aliphatic, e.g., alkanoic (C8 to C10) or aromatic e.g. C6 to C10 carboxylic acids or sulfonyl peroxides, or azo compounds or the like with said peroxides.

The components are generally used in a molar ratio of from 1:4 to 4:1.

Good rates of graft copolymerization are achieved with these catalysts at temperatures between about 20° and about 90° C.

Examples of peroxydicarbonates are: diisopropylperoxydicarbonate, dicyclohexylperoxydicarbonate, dicetylperoxydicarbonate, distearylperoxydicarbonate, di-2-(ethylhexyl)-peroxydicarbonate and the like.

Examples of aliphatic or aromatic carboxylic acids are distearoyl peroxide, dilauroyl peroxide, dibenzoyl peroxide, halogenated dibenzoyl peroxides, and the like.

An example of a sulfonyl peroxide is acetylcyclohexane sulfonyl peroxide, and an example of an azo compound is azoisobutyric acid dinitrile.

Examples of combinations are, first of all, peroxydicarbonates, such as dicetylpercarbonate, with peroxides of aliphatic monocarboxylic acids, such as, for example, dilauroyl peroxides or distearoyl peroxides.

In general, the initiator combinations are used in an amount of 0.001 to 5% of the weight of the monomeric vinyl chloride.

The ethylene-vinyl acetate and ethylene-alkyl acrylate copolymers used as the basic polymers are easily grindable substances which do not cake up in storage and transportation. It is preferably to use basic polymers having molecular weights between 5,000 and 1,000,000, preferably of 15,000 to 80,000. The molecular weight is measured osmometrically in chlorobenzene.

Graft copolymers prepared by the method of the invention are especially suitable for use as impact strength improving components for polyvinyl chloride or vinyl chloride copolymers. Especially suitable for this purpose are those ethylene-vinyl acetate or ethylene-alkyl acrylate copolymers which contain between 5 and 70 wt.-% of vinyl chloride, preferably between 10 and 60 wt.-%, grafted on, those copolymers especially being used as basic polymers in which 0.5 to less than 15 wt.-%, and preferably 3.5 to 13 wt.-%, of vinyl acetate or alkyl acrylate and 99.5 to 85 wt.-%, preferably 96.5 to 87 wt.-%, of ethylene has been copolymerized.

For the achievement of good impact strengths, especially below room temperature or at low temperatures, amounts between 4 and 15 wt.-% of the graft copolymer are required. In general, amounts between 5 and 12% by weight produce good results.

If vinyl chloride copolymers are contained in the mixture instead of PVC or in addition to thereto, they can be the conventional vinyl chloride copolymers which can be used in preparing molding compositions, in which usually up to about 15%, more rarely up to about 40%, by weight, of a monoethylenic monomer has been copolymerized with vinyl chloride.

If copolymers of ethylene and alkyl acrylates are used as the basic polymer, those having alkyl groups of 1 to 8 carbon atoms, as well as straight-chained and even branched copolymers are preferred, of which the ethyl butacrylates and ethyl hexylacrylates can be named in addition to butyl acrylate.

The graft copolymer and the polyvinyl chloride, preferably powdered PVC, together with additives if desired, are compounded to form a polymer mixture. The amount of polyvinyl chloride and additives together amount to 100% of the weight of the graft polymer, the additives amounting to no more than the small, conventional amounts ranging from about 2 to no more than 10% by weight.

These tested additives, which partly are desired to facilitate working and partly are required or desired in various cases for the conditioning of the product, such as lubricants, thermal stabilizers, stabilizers against decomposition, ultraviolet stabilizers and the like, can also be combined in special cases with other additives, such as small amounts of active fillers.

The optimum conditions in the compounding of the components in the softened, thermoplastic state, for example on a roller mixer at temperatures ranging between about 150° and about 195° C., are to be determined in each case by persons skilled in the art. Particularly the quantity and the chlorine content of the graft copolymer are to be given consideration in the fabricating operations, increases in the amounts of the graft copolymers necessitating higher fabricating temperatures and increases in the chlorine content, i.e., increases in the content of the on-grafted vinyl chloride, necessitating lower fabricating temperatures.

The ethylene vinyl acetate copolymer used as the basic polymer in the method of the invention should be present in the grain size range from above 0 to less than 1000 microns, preferably in the grain size range from above 0 to less than 300 microns. The greater part of the grains (over 50 to 80 wt.-%) should be in the grain size range between about 100 to 150 microns.

By the method of the invention one can graft vinyl chloride onto ethylene-vinyl acetate copolymers in powder form on a commercial scale, graft polymers being obtained thereby which are free-flowing powders and have excellent working qualities. Even upon long storage, and even storage at elevated temperature, e.g., at temperatures between 30° and 60° C., no caking occurs. The gel graft polymers can be mixed in a simple manner with powdered polyvinyl chloride and fabricated from the powder. Even during the grafting, no sticking occurs. Since the grafting is performed without the use of water, the method of the invention is very economical, since the use of suspending agents or other adjuvants, for example, is eliminated and the end product does not have to be subjected to any further recovery process. It is also remarkable that, during the grafting, no sticking of the particles to one another and to the walls of the autoclaves is observed. The autoclaves therefore do not have to be cleaned. Also advantageous is the fact that the residual monomer content can easily be removed from the graft polymer, for example by the application of a vacuum.

The graft copolymers are characterized by excellent workability and by excellent thermal stability and weather resistance. The graft copolymers prepared in accordance with the present invention distinguish themselves from graft copolymers of similar composition which are presently available on a commercial scale, by the fact that, in mixture with polyvinyl chloride, they can not only be made into fabricated products of improved impact strength, but also into products which at the same time have a higher rigidity. At the same time such products have an improved surface gloss. Also, their range of working tolerances is greater than that of common commercial products. This expresses itself in the fact that higher U-notch impact test strengths and impact toughnesses are achieved in a wider temperature range.

In order to more fully illustrate the nature of the invention and the manner of practicing the same the following examples are presented.

EXAMPLES 1 to 13

As the table indicates, autoclaves of different sizes were used. These autoclaves were equipped with a band mixer (spiral stirrer), a jacket (heating and cooling by circulation) and a pressure gauge. The autoclaves were freed of air oxygen by nitrogen or vacuum (and purging with VC). As the grafting base, an ethylene-vinyl acetate copolymer (EVA copolymer) was used containing 7.5 wt.-% of vinyl acetate and having a molecular weight of 28,000 (measured osmometrically in chlorobenzene). In the performance of the experiments, first the autoclave was charged with the EVA-7.5 copolymer and with the catalyst. Then the autoclave was freed of air oxygen (nitrogen, or vacuum followed by VC). The catalyst and the EVA copolymer were stirred for ½ hour in each case, and then the VC was added and the mixture was stirred at 20° C. for another half hour. Then it was heated to the polymerization temperature. At the end of the experiment the autoclave was relieved of pressure and the residual VC was removed by a vacuum.

Experiments 1 to 8 were performed at a constant circulation temperature. Experiments 9 to 13 were controlled by constant pressure, i.e., the circulation temperature decreased in the course of the polymerization for the purpose of removing the reaction heat.

Half of the vinyl chloride was placed in the reactor at the beginning. After most of the vinyl chloride had been used up, the second half of the vinyl chloride was pumped in.

The amount of initiator or initiator combination was 0.5% by weight in the one-liter autoclave, 0.3% by weight in the 100-liter autoclave, and 0.1% by weight in the 2200 liter autoclave, with respect, in each case, to the monomeric vinyl chloride.

Examples 9 and 11 are examples in accordance with the invention. The rest are given for purposes of comparison.

For a judgment of workability, the graft copolymer was mixed with PVC homopolymer of a K value of 68 (8 parts graft copolymer to 100 parts PVC) and, with the conventional additives, is extruded as an agglomerate at various temperatures in a single-spindle laboratory extruder to form a ribbon 2.5 cm wide and 0.1 cm thick. The surface is judged with a score of 1 to 6, 1 being considered to be very good.

The results are given in the table, wherein DLP represents dilauroyl peroxide, DCPK dicetyl percarbonate, pulv. represents EVA powder (finer than 300μ), gran. represents granulated EVA, and cont. represents "controlled". The yield relates to the vinyl chloride charged.

TABLE

| No. | Autoclave | | Catalyst | Circulation Temp. (°C.) | Yield (%) with respect to VC input | Time (h) | Amount of EVA (kg) | | Amount of VC (kg) | Fabrication |
|---|---|---|---|---|---|---|---|---|---|---|
| 1 | 1 | 1 | DLP | 68 | 85 | 5 | 0,165 | pulv. | 0.165 | 6 |
| 2 | 30 | 1 | DLP | 68 | 56 | 8 | 4,950 | pulv. | 4.950 | 5 |
| 3 | 1 | 1 | DLP | 68 | 87 | 5 | 0,165 | gran. | 0.165 | 6 |
| 4 | 30 | 1 | DLP | 68 | 88 | 5 | 4,950 | gran. | 4.950 | 6 |
| 5 | 1 | 1 | DCPK | 50 | 78 | 6 | 0,165 | pulv. | 0.165 | 5 |
| 6 | 30 | 1 | DCPK | 50 | 75 | 6 | 4,950 | pulv. | 4.950 | 4 |
| 7 | 100 | 1 | DCPK | 50 | 45 | 10 | 16,0 | pulv. | 16.0 | 4 |
| 8 | 100 | 1 | DCPK | 35 | 85 | 14 | 16,0 | pulv. | 16.0 | 5 |
| 9 | 100 | 1 | DLP/DCPK* | 43 – 45 cont. | 85 | 6 | 16,0 | pulv. | 16.0 | 2 |
| 10 | 100 | 1 | DLP | 60 – 68 cont. | 88 | 4 | 16,0 | gran. | 16.0 | 6 |
| 11 | 2200 | 1 | DLP/DCPK* | 35 – 43 cont. | 85 | 6 | 400 | pulv. | 400 | 1 |
| 12 | 2200 | 1 | DCPK | 35 – 43 cont. | 45 | 15 | 400 | pulv. | 400 | 3 |
| 13 | 2200 | 1 | DLP | 45 – 55 cont. | 41 | 15 | 400 | pulv. | 400 | 4 |

*Molar ratio 1 : 1

The experiments show that, by means of the method of the invention, powdered VC-EVA gel graft copolymers can be prepared on a technical scale, and that they have excellent working properties. Experiments with other catalyst combinations, such as dicyclohexylpercarbonate with dilauroylperoxide, for example, product the same result.

What is claimed is:

1. In a method of grafting vinyl chloride onto an ethylene-vinyl acetate or ethylene-alkyl acrylate copolymer in the solid phase by contacting the same with vinyl chloride in the presence of a radical former soluble in the monomer, the improvement which comprises employing ethylenevinyl acetate or ethylene-alkyl acrylate in powder form having a particle size from above 0 to less than 1,000 microns and employing as the radical former at least two initiators having different decomposition temperatures.

2. A method according to claim 1 wherein the ethylene-vinyl acetate or ethylene-alkyl acrylate copolymer contains 0.5 to less than 15 wt.-% of vinyl acetate or alkyl acrylate units and 85 to 99.5 wt.-% ethylene units.

3. A method according to claim 2 wherein the ethylene-vinyl acetate or ethylene-alkyl acrylate copolymer contains 3.5 to 13 wt.-% of vinyl acetate or alkyl acrylate unis and 87 to 96.5 wt.-% ethylene units.

4. A method according to claim 1 wherein vinyl chloride contacts an ethylene-vinyl acetate copolymer.

5. A method according to claim 1 wherein said vinyl chloride contacts an ethylene-alkyl acrylate copolymer.

6. A method according to claim 1 wherein the polymerization is effected at a pressure below the saturation pressure of vinyl chloride.

7. A method according to claim 1 wherein the ethylene-vinyl acetate or ethylene-alkyl acrylate copolymer has a particle size from above 0 to less than 300 microns.

8. A method according to claim 1 wherein 50 to 80 wt.-% of the particles of powdered ethylene-vinyl acetate or ethylene-alkyl acrylate copolymer have a grain size between 100 and 150 microns.

9. A method according to claim 1 wherein the polymerization is effected in a vessel have a capacity of at least 100 liters.

10. A method according to claim 9 wherein the polymerization is effected in a vessel having a capacity of at least 1000 liters.

11. A method according to claim 1 wherein initially vinyl chloride is diffused at a temperature below the polymerization temperature into the ethylene-vinyl acetate or ethylene-alkyl acrylate copolymer disposed in a pressure vessel until the disappearance of the liquid phase, the ratio of ethylene-vinyl acetate or ethylene-alkyl acrylate copolymer to vinyl chloride being in a weight ratio of 10:0.1 to 10:5 and thereafter grafting of said vinyl chloride onto said copolymer is effected by heating the polymerization mass at a temperature of at least the polymerization temperature.

12. A method according to claim 11 wherein additional vinyl chloride is injected into the polymerization mass while the same is maintained at a temperature of at least the polymerization temperature.

13. A method according to claim 11 wherein graft polymerization is effected while the mass is continuously stirred.

14. A method according to claim 1 wherein the combination of initiators is mixed with the ethylene-vinyl acetate or ethylene-alkyl acrylate copolymer at a temperature below the polymerization temperature and is introduced into a pressure reaction vessel.

15. A method according to claim 1 wherein the difference in the decomposition temperatures of the initiators amounts to 5° C. to 30° C.

16. A method according to claim 1 wherein one of said initiators is a radical former whose decomposition temperature lies in the range of 0° C. to 45° C. and the other initiator has a decomposition temperature which is greater.

17. A method according to claim 1 wherein the ethylene-vinyl acetate or ethylene-alkyl acrylate copolymer has a molecular weight between 5000 and 1,000,000.

18. A method according to claim 17 wherein the ethylene-vinyl acetate or ethylene-alkyl acrylate copolymer has a molecular weight of 15,000 to 80,000.

19. A method according to claim 1 wherein the vinyl chloride is in admixture with a comonomer, said copolymer being vinyl acetate, ethylene, propylene or acrylonitrile.

* * * * *